(12) United States Patent
Beltran et al.

(10) Patent No.: US 7,190,781 B2
(45) Date of Patent: Mar. 13, 2007

(54) MESSAGE TRANSFER PART POINT CODE MAPPING METHOD AND NODE

(75) Inventors: Maria Trinidad Martinez Beltran, Saltillo (MX); Jose del Carmen Vazquez Gamboa, Saltillo (MX)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 811 days.

(21) Appl. No.: 10/038,981

(22) Filed: Jan. 4, 2002

(65) Prior Publication Data

US 2003/0128832 A1  Jul. 10, 2003

(51) Int. Cl.
*H04M 7/00* (2006.01)

(52) U.S. Cl. ............... 379/229; 379/230; 379/115.03; 379/220.01; 370/352

(58) Field of Classification Search ............... 379/230, 379/229, 115.03, 220.01; 370/352
See application file for complete search history.

(56) References Cited

U.S. PATENT DOCUMENTS

| | | | |
|---|---|---|---|
| 5,838,782 A | 11/1998 | Lindquist | 379/230 |
| 5,852,660 A * | 12/1998 | Lindquist et al. | 379/230 |
| 5,862,129 A | 1/1999 | Bell et al. | 370/236 |
| 5,892,822 A * | 4/1999 | Gottlieb et al. | 379/115.03 |
| 5,926,482 A | 7/1999 | Christie et al. | 370/469 |
| 5,953,404 A * | 9/1999 | Fikis et al. | 379/230 |
| 5,987,111 A * | 11/1999 | Madoch et al. | 379/220.01 |
| 6,094,578 A | 7/2000 | Purcell et al. | 455/426 |
| 6,175,574 B1 | 1/2001 | Lewis | 370/522 |
| 6,178,181 B1 | 1/2001 | Glitho | 370/467 |
| 2001/0036173 A1 * | 11/2001 | Shmulevich et al. | 370/352 |
| 2002/0196779 A1 * | 12/2002 | Khadri et al. | 370/352 |

FOREIGN PATENT DOCUMENTS

| | | |
|---|---|---|
| WO | WO 00/42781 | 7/2000 |
| WO | WO 00/51395 | 8/2000 |

OTHER PUBLICATIONS

International Search Report, PCT/IB03/00005, dated Mar. 19, 2003.

* cited by examiner

*Primary Examiner*—Fan Tsang
*Assistant Examiner*—Alan Elahee (57) ABSTRACT

A method and network node are presented to route a signaling message in a SS7/C7 national telecommunication network between a Border Node within a first licensed operator network and a destination node within a second licensed operator network. The first and second licensed operator networks use the same Point Code configuration numbering plan to identify Point Codes of each node into their respective network. The Border Node includes a Message Transfer Part (MTP). Upon receipt of a signaling message, the Message Transfer Part (MTP) of the Border Node maps an Origination Point Code (OPC) and a Destination Point Code (DPC) corresponding to numbering plan values of the one of the licensed operator networks into OPC and DPC corresponding to the other licensed operator network. After that, the MTP replaces the OPC and DPC by the mapped OPC and DPC and the signaling message is sent from the Border Node to the destination node.

8 Claims, 5 Drawing Sheets

MESSAGE TRANSFER PART POINT CODE MAPPING METHOD AND NODE

BACKGROUND OF THE INVENTION

1. Technical Field

The present invention relates to Signaling System 7 (SS7/C7) networks and, more particularly, to a mapping function and method for transmitting signaling messages from a first licensed operator network to a second licensed operator network, where both operator networks use the same national numbering plan to assign point codes identifications.

2. History of Related Art

The evolution of telecommunication networks has resulted in a need today for using international gateways, Global Title databases and Point Code databases that require complex and precise inter-working coordination between rival licensed operator networks to ensure the proper delivery of signaling messages.

As is known in the art, network nodes route SS7/C7 signaling messages within the SS7/C7 network and manage the various signaling links which comprise the SS7/C7 network. Routing is accomplished by processing a routing label of the SS7/C7 signaling message by a Message Transfer Part (MTP) functionality of a signaling point (SP). The MTP comprises three levels. Levels 1 and 2 facilitate the transfer of signaling messages from one point to another point over an individual signaling link. Level 3 facilitates the transfer of signaling messages over SS7/C7 networks beyond the requirements of the individual signaling links. In other words, levels 1 and 2 are concerned with transport over individual links whereas level 3 is concerned with transport over SS7/C7 network in general.

A node accomplishes its routing task at level 3 through the use of point codes, which identify the various signaling points in the network. The MTP level 3 of the node identifies the destination point code in the signaling message and selects the proper signaling link for routing that message. For example, if node A sends a signaling message to node B through a Signaling Transfer Point (STP), the message contains the origination point code for the signaling point in node A and the destination point code for the signaling point in node B. The STP accepts this message from one signaling link, reads the destination point code, and places the message on the appropriate link for node B.

Based on that, rival licensed operator networks, in order to exchange signaling messages, need to interconnect their SS7/C7 networks using gateways and complex inter-working configuration management schemes such as Global Titles or Point Codes, which requires a complex inter-working coordination to ensure proper delivery of signaling messages. This complex inter-working coordination between the operator networks increases the risk of inaccuracies during the definition of the Point Code databases. Such inaccuracies may result in Point Code conflicts for many operators and cause problems such as circular routing (signaling message routing continuously back and forth) due to duplication of Point Codes For example, this problem occurs when the operator network defines a node with a Point Code which is already used by another node within the same operator network or a rival operator network thus resulting in incorrect routing information. The incorrect routing information causes each processed signaling message to be routed repeatedly between nodes with the same Point Code without reaching its final destination. This circular routing condition continues indefinitely and may lead to network congestion and possible failure within the network.

Repeating Point Codes are also dangerous. For one thing, any one node cannot route towards two different nodes, which use the same Point Code. But worse, if one such node fails, all its neighbors will broadcast management messages (such as, Transfer Prohibited, TFP) which will be sent throughout both networks and stop all signaling to both the failed node and the healthy node.

SUMMARY OF THE INVENTION

The invention discloses a method and network node that solves the problems originated by the complex inter-working coordination necessary between operator networks during the definition of the Point Code databases and the resulting conflicts due to circular routing. Message Transfer Part (MTP) Point Code Mapping is a facility that allows different operators in the same national network to assign Point Codes independently, so the same Point Code may be used for two or more nodes. This improves the interconnection of global operators connected to several national networks and improves the interconnection of operators inter-working with other operators.

One embodiment of the method of the invention includes the step of receiving in the MTP of a Border Node of a first network, an outgoing signaling message to be sent to a second network. This signaling message includes routing information (OPC and DPC) in a corresponding first network own numbering plan of Point Codes values. The MTP of the Border Node then maps the OPC and DPC from the first network own numbering plan to a corresponding second network external numbering plan values based on a selected Link Set having an associated mapping table of Point Codes. The MTP of the Border Node then delivers the signaling message to the adjacent network based on the mapped Point Code values.

In another embodiment, the invention describes a method for handling incoming signaling messages received from the second network. The method starts when an incoming signaling message is received in the MTP of the first network Border Node from the second network, signaling message which includes the routing information (OPC and DPC) in the external numbering plan of Point Codes values. The MTP of the Border Node then maps the OPC and DPC from the external numbering plan to the corresponded first network own numbering plan values based on a Link Set (from which the incoming message is received) having an associated mapping table of Point Codes. The MTP of the Border Node then delivers the signaling message to the destination node based on the mapped Point Code values.

The invention is operable on a per Link Set basis and only one Border Node (of the Border Nodes interconnected by the Link Set) supports the MTP Point Code Mapping method for outgoing and incoming signaling message. Therefore each adjacent operator can have a different mapping and a different domain of accessible Point Codes. If the Border Node has a Link Set defined with the mapping function applied, it will perform mapping for all the outgoing messages and the incoming messages.

In another embodiment, the present invention is a network node that applies Message Transfer Part functions to signaling messages that contain point codes, wherein the network node applies MTP level 1 function, MTP level 2 function, MTP level 3 function and MTP level 4. The MTP level 3 includes a means for mapping the point codes in the signaling message into different point codes in a different numbering plan than the numbering plan of the Point Codes originally contained in the signaling message.

The invention includes a network, wherein the network includes a first and a second licensed operator network, the first licensed operator network includes a Border Node, the first and second licensed operator network assign Point Codes according to the same numbering plan, and the Border Node includes a MTP Point Code Mapping Table for the Link Set that connects the Border Node in the first licensed operator network to an adjacent Border Node in the second licensed operator network, the MTP Point Code Mapping Table associates an alias Point Code assigned in the first licensed operator network to a node in the second licensed operator network with the actual Point Code for that same node in the second licensed operator network. Based on the MTP Point Code Mapping Table associated with the Link Set that connects the Border Node in the first licensed operator network and the adjacent Border Node in the second licensed operator network, the Border Node in the first operator network maps the Point Code values for outgoing signaling message from own numbering plan to a external numbering plan and for incoming signaling message, the Border Node maps the Point Code values from the external numbering plan to own numbering plan.

The invention also includes a database for MTP Point Code Mapping Tables, wherein the MTP Point Code Mapping Tables includes a first identity field for an associated Link Set; a second identity field associated with Point Codes in an own numbering plan; and a third identity field associated with Point Codes in an external numbering plan. The first identity field typically contains the Link Set Identification of the Link Set associated to the MTP Point Mapping Table. The second identity field typically contains the Point Code values associated with the own numbering plan; and the third identity field contains the Point Code values associated with the external numbering plan.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PREFERRED EXEMPLARY EMBODIMENTS

Figure 1:
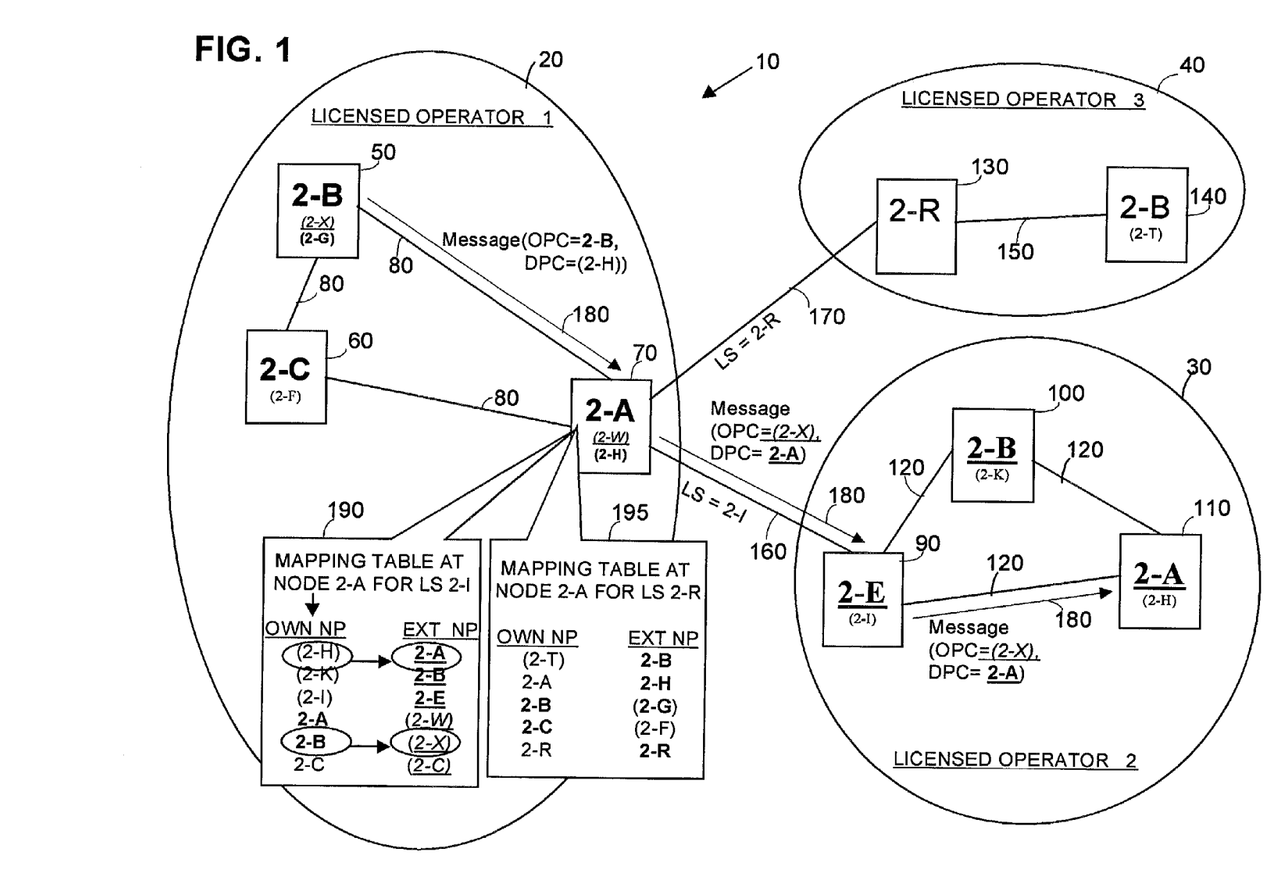
FIG. 1 shows a block diagram of a typical SS7/C7 network, where the MTP Point Code Mapping method is used in the scenario of sending outgoing signaling messages.

Referring to FIG. 1, there is shown a block diagram of a typical SS7/C7 network, where the MTP Point Code Mapping method is used in the scenario of sending outgoing signaling messages. In this case, three-licensed operator networks 20, 30, and 40 compose a national telecommunication network 10. The first licensed operator network 20 includes nodes 50, 60, and 70, where the node 70 acts as a Border Node toward the second licensed operator network 30 and third licensed operator network 40. As it can be seen, in the first licensed operator network 20, various Link Sets 80 connect the originating node 50, the node 60, and the Border Node 70. The second licensed operator network 30 includes nodes 90, 100, and 110, where the node 90 acts as Border Node toward the first licensed operator network 20. As it can be seen, in the second licensed operator network 30, various Link Sets 120 connect the node 90, the node 100, and the node 110. Also the third licensed operator network 40 is composed by Border Node 130 (toward the first licensed network 20) and node 140, which are connected through a Link Set 150.

The Border Node 70 (in the first licensed operator network 20) is interconnected toward an adjacent Border Node 90 (in the second licensed operator network 30) by a Link Set (160) and toward an adjacent Border Node 130 (in the third licensed operator network 40) by a Link Set (170). In Message Transfer part (MTP) level 3 of the Border Node 70 are stored Point Code Mapping tables 190 and 195, which are associated with the Link Sets 160 and 170, respectively. The Border Node 70 can act such as a Signaling Transfer Point (STP) or a Signaling End Point (SEP). It should be recognized that an STP can originate and receive signaling messages as well as having the ability to transfer signaling messages from one node to another; and that an SEP can only originate and receive messages, it has no transfer function. The Border Node 70 must work with Link Sets provided of a dual numbering plan for Point Codes: its own plan, and the external numbering plan of the adjacent licensed operator network(s) 30 and 40.

An important characteristic of this national telecommunication network 10 is that the MTP Point Code Mapping method is applicable to Border Nodes and for the Link Sets that interconnect these Border Nodes. In other words, for example for the Border Nodes 70 and 90 which are interconnected by the Link Set 160, only one Border Node (in this case the Border Node 70) has the MTP Point Code Mapping method active for the Link Set 160 and therefore this node performs the MTP Point Code Mapping for outgoing and incoming signaling messages (the scenario of incoming signaling message is described in FIG. 2). Otherwise, a circular routing condition between Border Nodes 70 and 90 occurs because of double mapping if both Border Nodes have the MTP Point Code Mapping method active.

Another important characteristic of this national telecommunication network 10 is that the three licensed operator networks 20, 30, and 40 are using the same numbering plan to identify their respective own nodes. This can be seen in the first licensed operator network 20 where its numbering plan identifies the nodes 50, 60, and 70 with the Point Codes 2-B, 2-C, and 2-A respectively. In the second licensed operator network 30, the numbering plan identifies the nodes 90, 100, and 110 with the Point Codes 2-E, 2-B, and 2-A. In the third licensed operator network 40, it identifies its nodes 130 and 140 with the Point Codes 2-R and 2-B. Based on this identification, the nodes 50, 100, and 140 in three different networks are using the same Point Code 2-B, and the nodes 70 and 110 in two different networks are using the same Point Code 2-A.

Because of this numbering plan characteristic, the licensed operator networks 20 and 30 each define an external numbering plan where an alias Point Code is assigned to each actual Point Code for the nodes of the adjacent licensed operator network from the perspective of each licensed operator network. For example, from the perspective of the first licensed operator network 20, the nodes 90, 100, and 110 (of the second licensed operator network 30) are referenced with the alias Point Codes 2-I, 2-K, and 2-H, respectively, and from the perspective of the second licensed operator network 30, the nodes 50 and 70 (of the first licensed operator network 20) are referenced with the alias Point Codes 2-X and 2-W, respectively. From the perspective of each licensed operator network, its own numbering plan is valid to identify its own respective nodes, and then the external numbering plan with the alias Point Codes is used to route messages to nodes of different licensed operator networks which use the same numbering plan.

Using this approach within the national telecommunication network 10, an outgoing signaling message is sent from originating node 50 (in the first licensed operator network 20) to terminating node 110 (in the second licensed operator network 30), these nodes 50, 110 are recognized by the first licensed operator network 20 within its own numbering plan with the actual Point Code 2-B (for the node 50) and the alias Point Code 2-H (for the node 110). Then, the node 50 sends the outgoing signaling message 180 to the Border Node 70 (which acts as a Signaling Transfer Point (STP)). The signaling message 180 includes an Originating Point Code (OPC) equal to 2-B (own actual Point Code according to own numbering plan) and a Destination Point Code (DPC) equal to 2-H (destination alias Point Code according to own numbering plan).

When the Border Node 70 receives the signaling message 180, it determinates based on the DPC that the destination node is located in an adjacent network (the second licensed operator network 30) and selects the Link Set (LS 2-I) 160 to route the signaling message 180. But if MTP Point Code Mapping method is activated, then for all outgoing signaling messages to an adjacent network, the Border Node 70 first checks if there exists a Mapping Table associated to the Selected Link Set 160. If so, then the Border Node 70 accesses the Mapping Table 190 (associated with Link Set 160) for mapping from the own numbering plan to external numbering plan of the second licensed operator network 30. In this case, the OPC 2-B is mapped to the corresponding external value 2-X (i.e., an alias Point Code in the second licensed operator network 30) and the alias DPC 2H is mapped to the corresponding external value 2-A (i.e., an actual Point Code in the second licensed operator network 30) from the perspective of the first licensed operator network 20. Then, the Border Node 70 replaces the old OPC 2-B by the new External Originating Point Code (EOPC) 2X (an alias) and the old DPC 2-H (an alias) by the new External Destination Point Code (EDPC) 2-A (from the perspective of the first licensed operator network 20) and sends the signaling message 180 to the adjacent Border Node 90 (in the second licensed operator network 30) via the Link Set 160. The node 90 recognizes the EOPC and EDPC as valid (according its own numbering plan) and routes the message 180 to the final destination node 110 because the DPC=2-A is the identification of this node according to the own numbering plan of the second licensed operator network 30.

Figure 2:
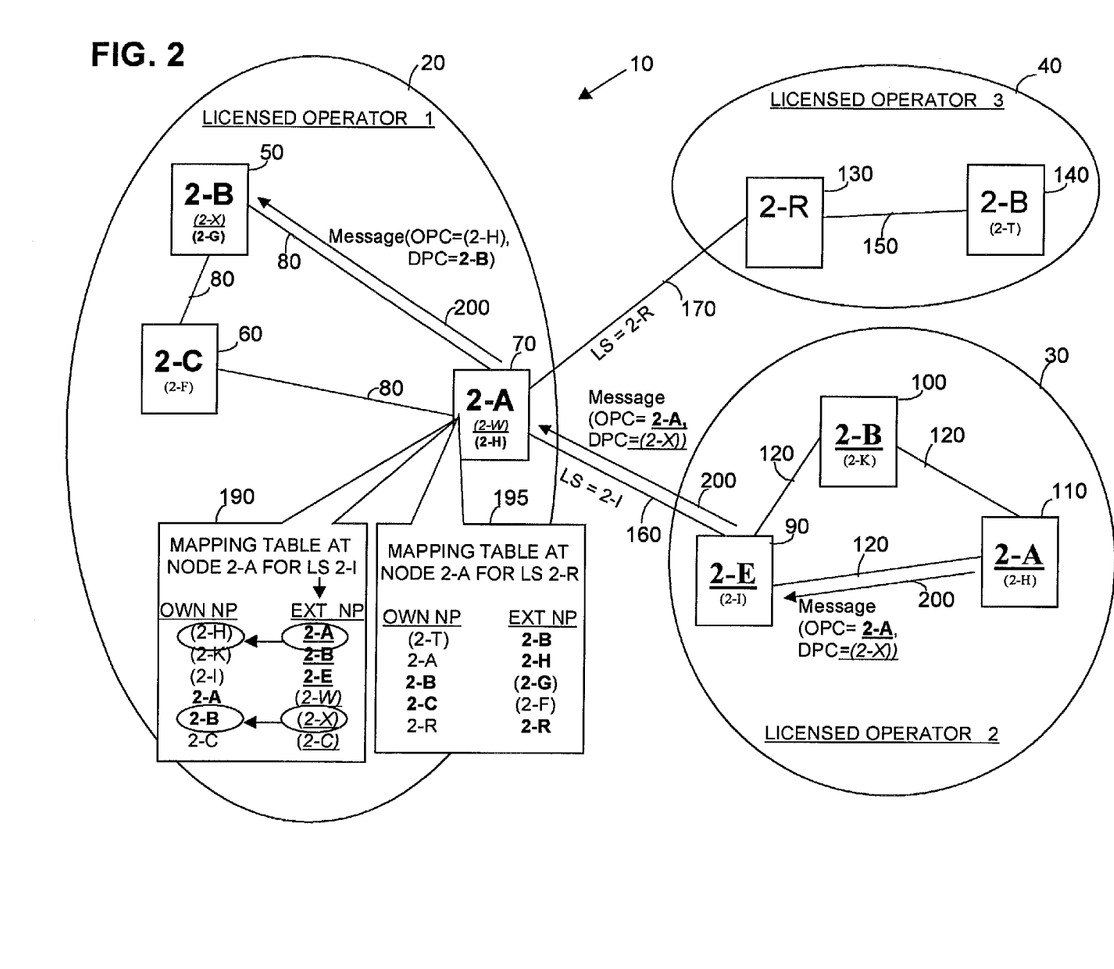
FIG. 2 shows a block diagram of a typical SS7/C7 network, where the MTP Point Code Mapping method is used in the scenario of receiving incoming signaling messages.

Turning now to FIG. 2, it shows a block diagram of a typical SS7/C7 network, where the MTP Point Code Mapping method is used in the scenario of receiving incoming messages, which is described in the same national telecommunication network 10 described in the FIG. 1, where the Border Node 70 of the first licensed operator network 20 supports MTP Point Code Mapping. In this embodiment an incoming signaling message (from the perspective of the first licensed operator network 20) is sent from originating node 110 (in the second licensed operator network 30) to terminating node 50 (in the first licensed operator network 20). These nodes 50, 110 are recognized by the second licensed operator network 30 within the its own numbering plan with the alias Point Code 2-X (for the node 50) and the actual Point Code 2-A (for the node 110). The node 110 sends a signaling message 200 to the Border Node 90. The signaling message 200 includes the OPC equal to 2-A (own Point Code according to its numbering plan) and DPC equal to 2-X (destination Point Code according to its numbering plan).

When the Border Node 90 receives the signaling message 200, it routes the signaling message 200 to the Border Node 70 through the Link Set 160 by using the OPC=2-A and DPC=2-X because the node 90 does not support MTP Point Code Mapping method based on the characteristic described in the FIG. 1 that for the Border Nodes 70 and 90 which are interconnected by the Link Set 160, only one Border Node (in this case the Border Node 70) has activated the MTP Point Code Mapping method for the Link Set 160 and therefore this node performs the MTP Point Code Mapping for outgoing and incoming signaling messages. Otherwise, a circular routing condition between Border Nodes 70 and 90 occurs because of double mapping if both Border Nodes have the MTP Point Code Mapping method active.

When the Border Node 70 receives the incoming signaling message 200 from the Link Set 160, if the MTP Point Code Mapping method is activated, then for all incoming messages from an adjacent network, the Border Node 70 first checks if there exists a Mapping Table associated to the Link Set 160 on which the signaling message is received. If so, then the Border Node 70 accesses the Mapping Table 190 (associated with Link Set 160) for mapping from the external numbering plan (of the second licensed operator 30) to its numbering plan. In this case, the OPC 2-A (i.e., an actual Point Code in the second licensed operator network 30) is mapped to the corresponding own value 2-H (i.e., an alias Point Code in the first licensed operator network 20) and the DPC 2-X (i.e., an alias Point Code in the second licensed operator network 30) is mapped to the corresponding own value 2-B (i.e., an actual Point Code in the first licensed operator network 20). At that moment, the Border Node 70 replaces in the signaling message 200 the old OPC 2-A by the new OPC 2-H and the old DPC 2-X by the new DPC 2-B and sends the signaling message 200 to the Terminating Node 50, because DPC 2-B is the identification of this node according to the own numbering plan of the licensed operator network 20.

Figure 3:
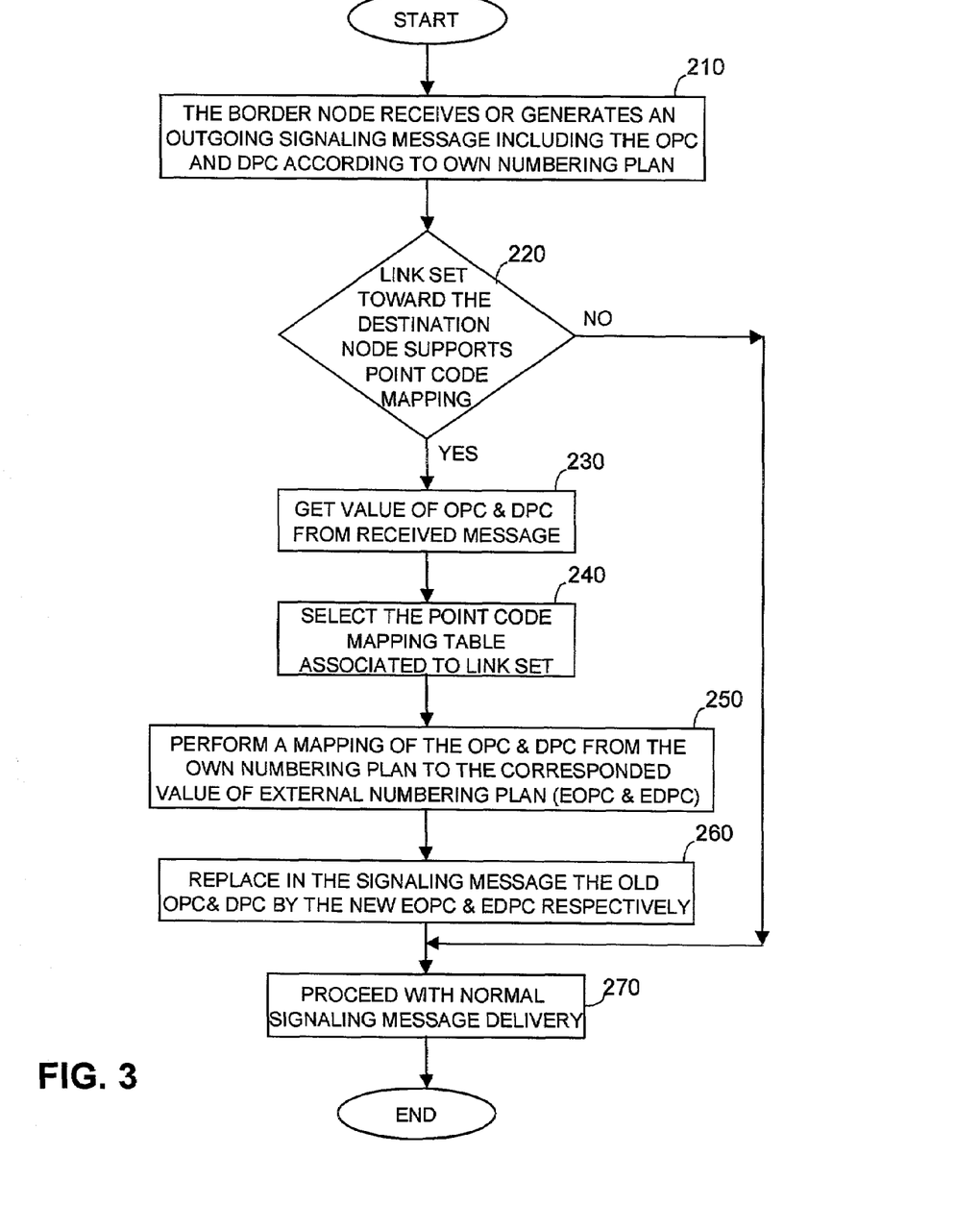
FIG. 3 shows a flow chart of MTP Point Code method used for outgoing signaling message.

Turning now to FIG. 3, it shows a flow chart of MTP Point Code method used for outgoing signaling message, which summarizes the procedure to provide MTP Point Code Mapping method in the Border Node 70 located in a first network (described in the FIG. 1) during the scenario of outgoing signaling message. The procedure starts in step 210 when the Border Node receives (when the node acts as STP) or originates (when the node acts as SEP) in its Message Transfer Part (MTP) an order to send an outgoing message. The message includes the actual OPC and alias DPC according to the own numbering plan. Then, the MTP of the Border Node selects the Link Set over which the outgoing messages are sent toward the destination node located in a second network (typically, the routing information contained in the message is used to select the Link Set, in other words, the DPC is used to select a Link Set and the Signaling Link Selection (SLS) is used to select the link within the Link Set on which to place the message). In step 220, a verification is performed in order to check whether the selected Link Set supports MTP Point Code Mapping, in other words, if there exists a Mapping Table associated to the selected Link Set because the message will be delivery to the second network through of the selected Link Set, which acts as an signaling interface toward the second network. For instance, where the Link Set does not support MTP Point Code Mapping, the MTP of the Border Node proceeds to deliver the signaling message in a normal way (step 270). But in the case where the determination is that the Link Set supports MTP Point Code Mapping, the actual OPC and alias DPC (from the perspective of the own numbering plan of the first network) are extracted from the signaling message (step 230), and selection of the MTP Point Code Mapping Table associated to the Link Set is performed in step 240 (this step is done in base to the Link Set identification, which is used as a pointer toward the associated Mapping Table of the set of Mapping Tables which is stored in the database). After that, a mapping function is performed in step 250, where the actual OPC and alias DPC are mapped from the own numbering plan to the corresponding alias OPC and actual DPC value in the external numbering plan. Afterwards, the MTP of the Border Node replaces in the signaling message the old OPC and DPC by the new alias OPC and new actual DPC (step 260) and the message is delivered to the destination node in step 270.

Figure 4:
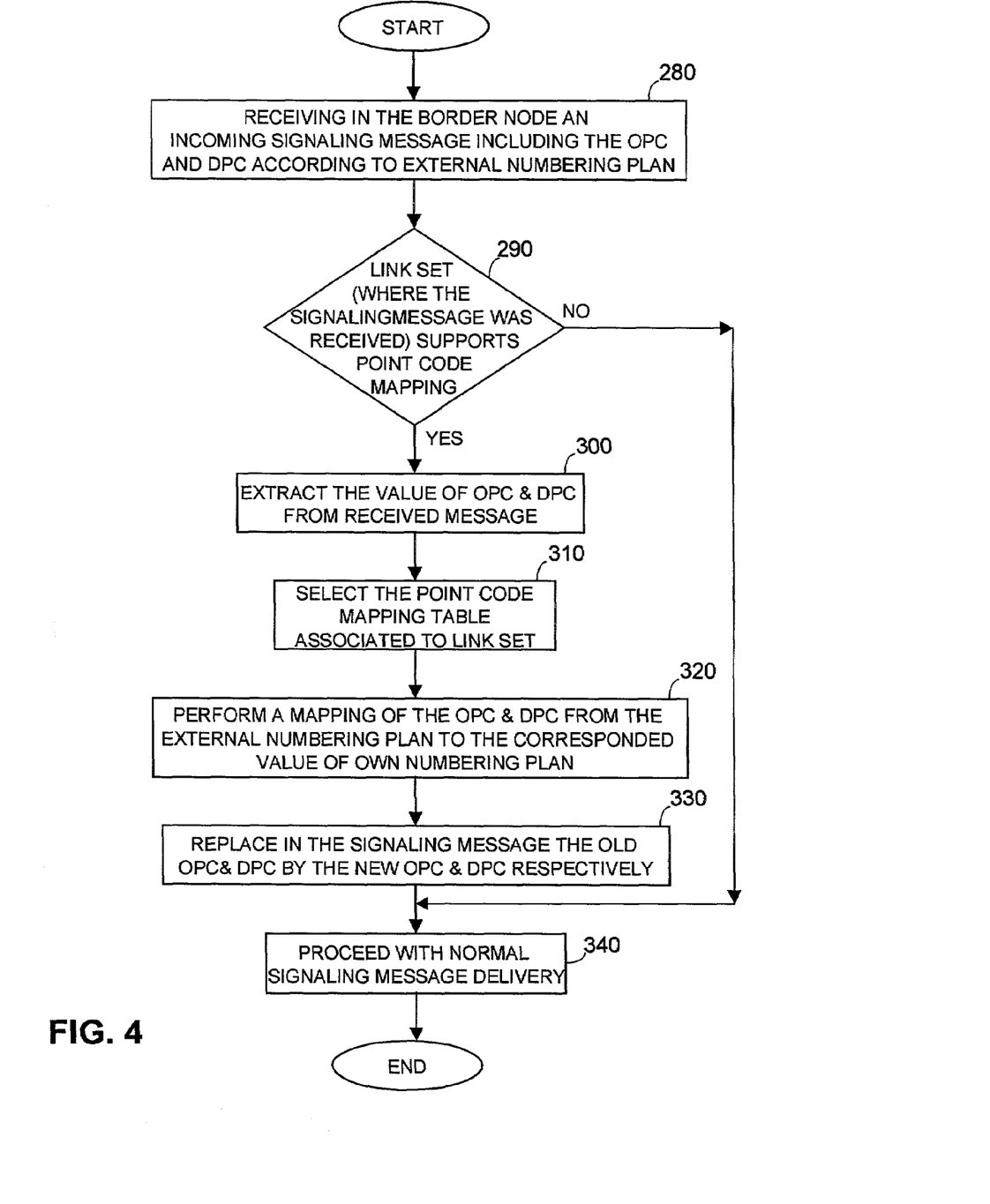
FIG. 4 shows a flow chart of MTP Point Code method used for incoming signaling message.

Turning now to FIG. 4, there is shown a flow chart of MTP Point Code method used for incoming signaling message, which shows a sequence for performing MTP Point Code Mapping in a Border Node 70 (described in the FIG. 2) during the scenario of incoming signaling message. The procedure starts in step 280 when the Border Node receives in its Message Transfer Part an incoming signaling message from a second network. The incoming signaling message includes the actual OPC and alias DPC according to the external numbering plan. Upon receipt of the incoming signaling message, the MTP of the Border Node verifies in step 290 whether the Link Set (where the incoming signaling message was received from) supports MTP Point Code Mapping, in other words, if there exists a mapping Table associated to the Link Set because the signaling message is received from an adjacent network. Upon determining that the Link Set does not support MTP Point Code Mapping, the MTP Border Node proceeds to deliver the incoming signaling message in a normal way (step 340). But in the case where the determination is that the Link Set supports MTP Point Code Mapping, the actual OPC and alias DPC in a external numbering plan are extracted from the incoming signaling message (step 300) and the MTP Point Code Mapping Table associated to the Link Set in step 310 is selected (this step is done in base to the Link Set identification, which is used as a pointer toward the associated Mapping Table of the set of Mapping Tables which is stored in the database). After that, a mapping function is performed in step 320, where the actual OPC and alias DPC are mapped from the external numbering plan to corresponded alias OPC and actual DPC values in the own numbering plan. After the MTP of the Border Node replaces in the incoming signaling message the old actual OPC and alias DPC by the new alias OPC and actual DPC (step 330), the message is delivered to the destination node in the first network in step 340.

Figure 5:
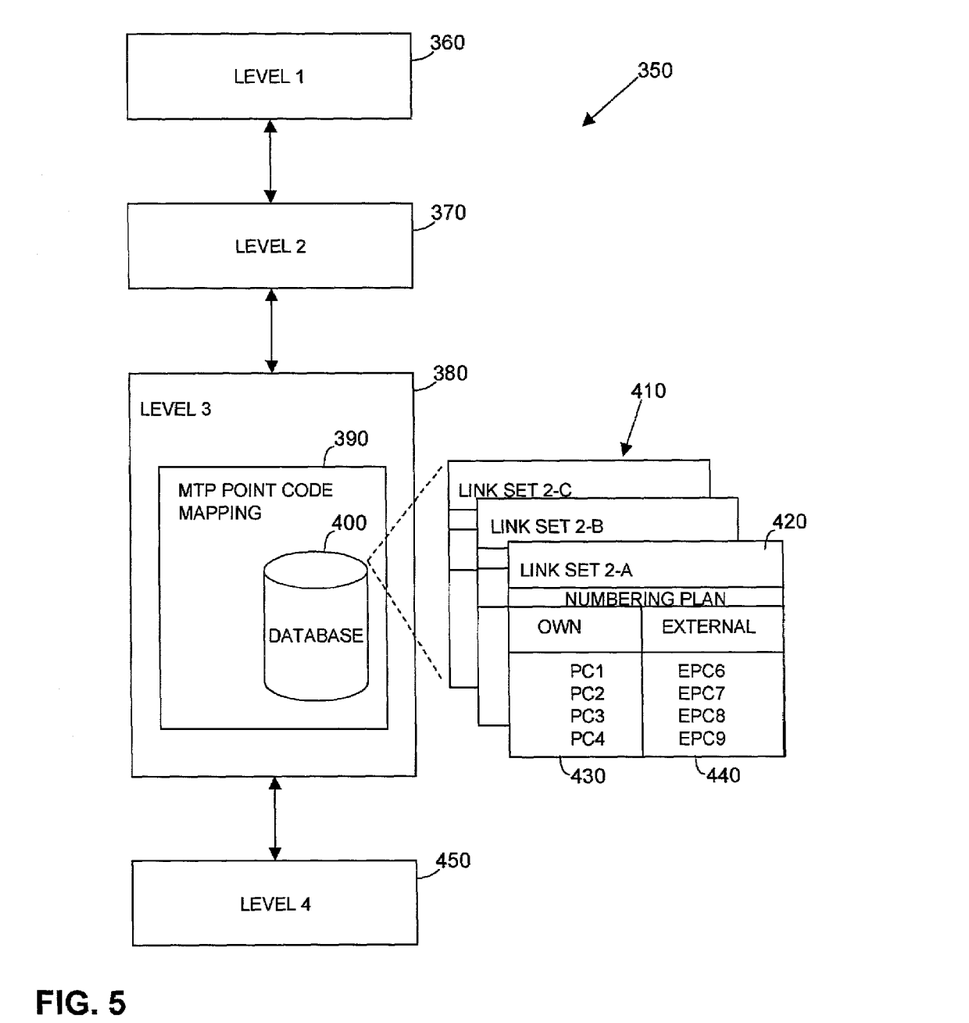
FIG. 5 depicts a functionality of network node and elements of a database for MTP Point Code Mapping.

FIG. 5 depicts a functionality of network node and elements of a database for MTP Point Code Mapping. Wherein the network node 350 (in this case a Border Node) is composed by Signaling Data Link (MTP level 1) 360, Signaling Link (MTP level 2) 370, Signaling Network (MTP level 3) 380 and User Part (MTP level 4) 450. Additionally MTP Point Code Mapping 390 including database 400 of MTP Point Code Mapping Tables 410 are shown as functions of Signaling Network (MTP level 3) 380.

The MTP Point Code Mapping 390 translates (using the MTP Point Code Mapping Tables 410) the actual OPC and alias DPC from own numbering plan to alias OPC and actual DPC in external numbering plan for the signaling messages coming from User Part (MTP level 4) 450 (outgoing messages) and for incoming signaling messages (signaling messages coming from Signaling Link (MTP level 2) 370), the MTP Point Code Mapping 390 translates from external numbering plan (actual OPC and alias DPC) to own numbering plan (alias OPC and actual DPC).

Each MTP Point Code Mapping Table 410 is associated to a specific Link Set, but each MTP Point Code Mapping Table 410 can be used for several Link Sets at same time. Typically, these MTP Point Code Mapping Tables 410 could logically reside in the database 400 in the MTP software processed by the network node (STP or SEP).

The appropriate MTP Point Code Mapping Table 410 could be selected based on the Link Set identification (field 420 of the database structure) that the message arrive on (for the case of incoming message) or when the Link Set is selected to route a message (for the case of outgoing message). This Link Set identification represents the origin or destination of the signaling messages. The MTP Point Code Mapping Tables 410 could then use the OPC and DPC of the signaling message to select new or translated OPC and DPC based on the direction (incoming or outgoing) of the signaling message, where for the case of incoming signaling message the column 440 (External numbering plan) the actual OPC and alias DPC are used as index in said column 440, in order to translate the actual OPC and alias DPC to the corresponding alias OPC and actual DPC values of the column 430 (Own Numbering Plan) and for the case of outgoing signaling message the column 430 (Own Numbering Plan) the actual OPC and alias DPC of the signaling message are used as index in said column 430, in order to translate the actual OPC and alias DPC to the corresponding alias OPC and actual DPC values of the column 440 (External Numbering Plan).

Because the MTP Point Code Mapping method acts on signaling as entering MTP level 3 processing, multiple kind of network nodes can be accommodated such as Telephone Switch, Mobile Switching Center, Home Location Register, Authentication Center, Signaling Control Point, Signaling Switching Point, Billing Center, Message Center, Signaling Data Point, Visitor Location Register, Mobile Positioning Center, Operation & Maintenance Center, etc. These nodes use the MTP service and therefore the MTP Point Code Mapping is applicable to several market (for example ITU-T, Chinese (MPT) and Japanese (TTC) markets, etc.)

The MTP Point Code Mapping allows to have several licensed operator networks using the same Point Code numbering plan and therefore to assign Point Codes independently. Also, based on that MTP Point Code Mapping method includes a MTP Point Code Mapping Tables for the Link Set that connects the Border Node in the first licensed operator network to an adjacent Border Node in the second licensed operator network. This may allow to global or dominant licensed operator network may have the control of the MTP Point Code Mapping in its Border Node and therefore improves the inter-working coordination with the others licensed operator networks, in other words, the dominant licensed operator network may perform the MTP Point Code Mapping activities for incoming or outgoing signaling messages for the national network and therefore there is no coordination impact for the others licensed operator networks and therefore to protect to the licensed operator networks from routing problems such as circular routing due to duplication of point codes in each domain, or faulty management due to broadcast of fault transfer prohibited messages between networks.

Although the invention has been described with reference to specific embodiments, this description is not meant to be constructed in a limited sense. The various modifications of the embodiments, as well as alternative embodiments of the invention, will become apparent to person skilled in the art upon reference to the description of the invention. It is, therefore, contemplated that the appended claims will cover such modifications that fall within the scope of the invention, or their equivalents.

What is claimed is:

1. A method for routing a signaling message in a telecommunication network, wherein the telecommunication network includes a first licensed operator network and second licensed operator network, the first licensed operator network including a first Border Node adjacent to a second Border Node of the second licensed operator network, the method comprising:

providing a first numbering plan for use by the first licensed operator network, wherein the first numbering plan specifies the Point Codes used in the first licensed operator network;

providing a second numbering plan for use by the second licensed operator network wherein the second numbering plan specifies the Point Codes used in the second licensed operator network and wherein the first and second numbering plans use a same Point Code configuration numbering plan;

receiving at the first Border Node the signaling message comprising an Originating Point Code (CRC) and a Destination Point Code (DPC) in accordance with the first numbering plan;

mapping the OPC and the DPC of the signaling message from the first to the second numbering plan; and delivering the signaling message from the first Border Node to a destination node of the telecommunication network according to the mapped OPC and DPC, wherein the destination node is in the second licensed operator network, the step of mapping the OPC and the DPC of the signaling message further including:

checking in the MTP of the Border Node if the Link Set associated toward the destination node supports MTP Point Code Mapping, if so extracting the OPC and the DPC from the signaling message;

selecting an MTP Point Code Mapping Table associated to the Link Set;

performing a mapping in the MTP of the first Border Node of the OPC to an alias OPC;

performing a mapping in the MTP of the first Border Node, of the DPC to an actual DPC of the destination node; and replacing the OPC by the alias OPC and the DPC to the actual DPC, wherein the alias OPC and the actual DPC are known in the second licensed operator network.

2. The method of claim 1, wherein method is performed using Signaling System 7 (SS7/C7) protocol.

3. The method of claim 1, wherein receiving the signaling message is performed in a Message Transfer Part (MTP) of the first Border Node.

4. The method of claim 1, wherein the Border Node is a Signaling Transfer Point or a Signaling End Point.

5. The method of claim 1, wherein the signaling message is an outgoing signaling message or an incoming signaling message.

6. The method of claim 1, wherein the Link Set has associated therewith a Mapping Point Code Table.

7. The method of claim 1, wherein the destination node is in the first licensed operator network, the step of mapping the OPC and the DPC of the signaling message further including:

checking in a Message Transfer Part (MTP) of the first Border Node if a Link Set associated toward the destination node supports MTP Point Code Mapping, if so extracting the OPC and DPC from the signaling message;

selecting an MTP Point Code Mapping Table associated to the Link Set;

performing a mapping in the MTP of the first Border Node of the OPC to an alias OPC;

performing a mapping in the MTP of the first Border Node, of the DPC to an actual DPC of the destination node; and replacing the OPC by the alias OPC and the DPC by the actual DPC, wherein the alias OPC and the actual DPC are known in the first licensed operator network.

8. The method of claim 7, wherein the Link Set has associated therewith a Mapping Point Code Table.

* * * * *

UNITED STATES PATENT AND TRADEMARK OFFICE
CERTIFICATE OF CORRECTION

PATENT NO. : 7,190,781 B2
APPLICATION NO. : 10/038981
DATED : March 13, 2007
INVENTOR(S) : Beltran et al.

It is certified that error appears in the above-identified patent and that said Letters Patent is hereby corrected as shown below:

In Column 9, Line 34, in Claim 1, delete "(CRC)" and insert -- (OPC) --, therefor.

Signed and Sealed this

Eighth Day of April, 2008

JON W. DUDAS
*Director of the United States Patent and Trademark Office*